US007842885B2

(12) United States Patent
Calleja

(10) Patent No.: US 7,842,885 B2
(45) Date of Patent: Nov. 30, 2010

(54) SIMPLIFIED TRUSS ASSEMBLY AND LIGHTING TRACK INTERCONNECTION

(76) Inventor: Michael J. Calleja, 110 San Benito Rd., Brisbane, CA (US) 94005

( * ) Notice: Subject to any disclaimer, the term of this patent is extended or adjusted under 35 U.S.C. 154(b) by 218 days.

(21) Appl. No.: 12/215,823

(22) Filed: Jun. 30, 2008

(65) Prior Publication Data

US 2009/0201687 A1 Aug. 13, 2009

Related U.S. Application Data

(63) Continuation-in-part of application No. 12/069,201, filed on Feb. 9, 2008.

(51) Int. Cl.
*H02G 3/04* (2006.01)

(52) U.S. Cl. ..................... 174/68.1; 174/68.3; 362/648; 362/219; 439/532; 439/114

(58) Field of Classification Search ................ 174/68.1, 174/68.3; 362/648, 391, 219, 431; 439/114, 439/532, 369
See application file for complete search history.

(56) References Cited

U.S. PATENT DOCUMENTS

| | | | | |
|---|---|---|---|---|
| 2,606,278 | A * | 8/1952 | Smith | 362/219 |
| 4,620,268 | A * | 10/1986 | Ferenc | 362/517 |
| 4,712,165 | A * | 12/1987 | Cetrone | 362/147 |
| 4,866,581 | A | 9/1989 | Targetti | |
| 7,388,151 | B2 * | 6/2008 | Nishimoto | 174/68.3 |
| 7,524,082 | B2 * | 4/2009 | North | 362/219 |
| 7,560,644 | B2 * | 7/2009 | Ford et al. | 174/68.1 |

OTHER PUBLICATIONS

Livelite catalog page.

* cited by examiner

*Primary Examiner*—Dhiru R Patel
(74) *Attorney, Agent, or Firm*—Robert Charles Hill

(57) ABSTRACT

A simplified assembly truss system rivets each power track inside one chord of each truss span so that the electrical components cannot be misaligned inside the chord during final assembly. The chord is slotted to receive lighting heads in its mid-sections, and short end slots allow interconnecting plugs to be inserted into matching power track ends. A stop captured by the rivets near each chord-end indexes the interconnecting plugs to ensure the final electrical assembly is correct.

6 Claims, 23 Drawing Sheets

Fig. 16B
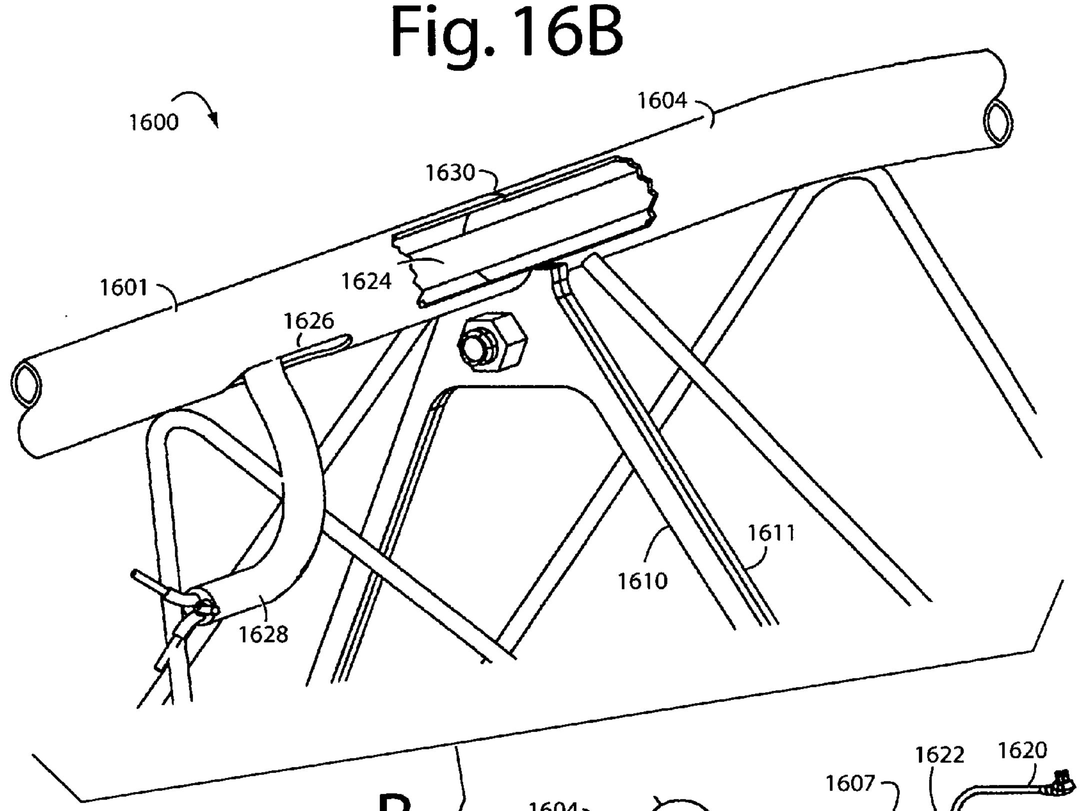
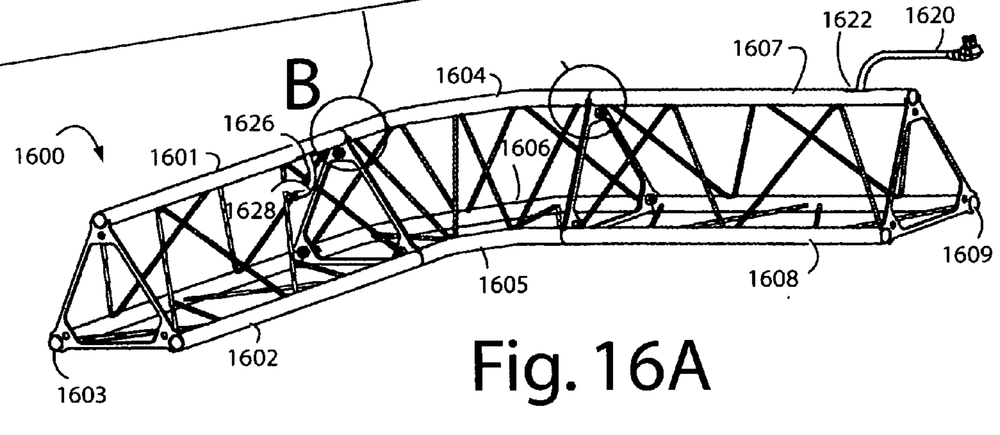
Fig. 16A

SIMPLIFIED TRUSS ASSEMBLY AND LIGHTING TRACK INTERCONNECTION

RELATED APPLICATIONS

This Application claims benefit of, and is a continuation-in-part of, U.S. patent application Ser. No. 12/069,201, filed Feb. 09, 2008, titled, TRUSS WITH LIGHTING TRACK, and is incorporated herein by reference.

BACKGROUND OF THE INVENTION

1. Field of the Invention

The present invention relates to lighting truss systems typically used in homes, offices, retail space, stages and trade shows. In particular, the present invention relates to trusses with electrical buss bars, insulator supports, and extruded aluminum carriers disposed in at least one steel truss chord and accessible for track light fixtures through slots.

2. Description of Related Art

Trusses are widely used to support overhead lighting units powered by electrical power cords dressed along the truss raceways. Truss systems for stages and tradeshow floors are available in I-beam, triangle, and square truss sections made from aluminum or steel. Steel trusses are strong enough to permit 40-foot spans, and aluminum trusses have the advantage that they can be made from extruded pieces. Extrusions allow the possibility of including power tracks inside for track lighting heads.

Trussing typically comes in ten-foot sections, and can be interconnected with 2, 3, 4, 5, and 6-way corners. The interconnections at the ends can be the tube-in-socket kind, or by butting together and bolting truss end plates.

Track lighting is another very flexible and adaptable lighting system, but more so for permanent installations. The power tracks themselves are usually very flimsy and need to be supported by bolting them to walls, ceilings, or support rods.

Line voltage track systems are dangerous and require large raceways that make the overall structures relatively large and clumsy. Low voltage systems enabled with step-down transformers permit much smaller and moderate structural piece sizes that make for easier and simplified installations.

SUMMARY OF THE INVENTION

Briefly, a simplified assembly truss system embodiment of the present invention rivets power tracks inside one chord of each truss span so that the power tracks cannot be misaligned inside the chord during final assembly. The chord is slotted to receive lighting heads in its mid-sections, and short end slots allow interconnecting plugs to be inserted into matching power track ends. A stop captured by the rivets near each chord-end indexes the inter-connecting plugs.

An advantage of the present invention is that a truss system is provided that does not allow incorrect or misaligned assembly by an installer.

Another advantage of the present invention is that a method is provided for the interconnection of low voltage power between truss sections.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIGS. 16A and 16B are perspective view diagrams of two lengths of straight truss sections and a radius corner section, showing how slots can be used to thread a power cord through the corner.

DETAILED DESCRIPTION OF THE INVENTION

Figure 1:
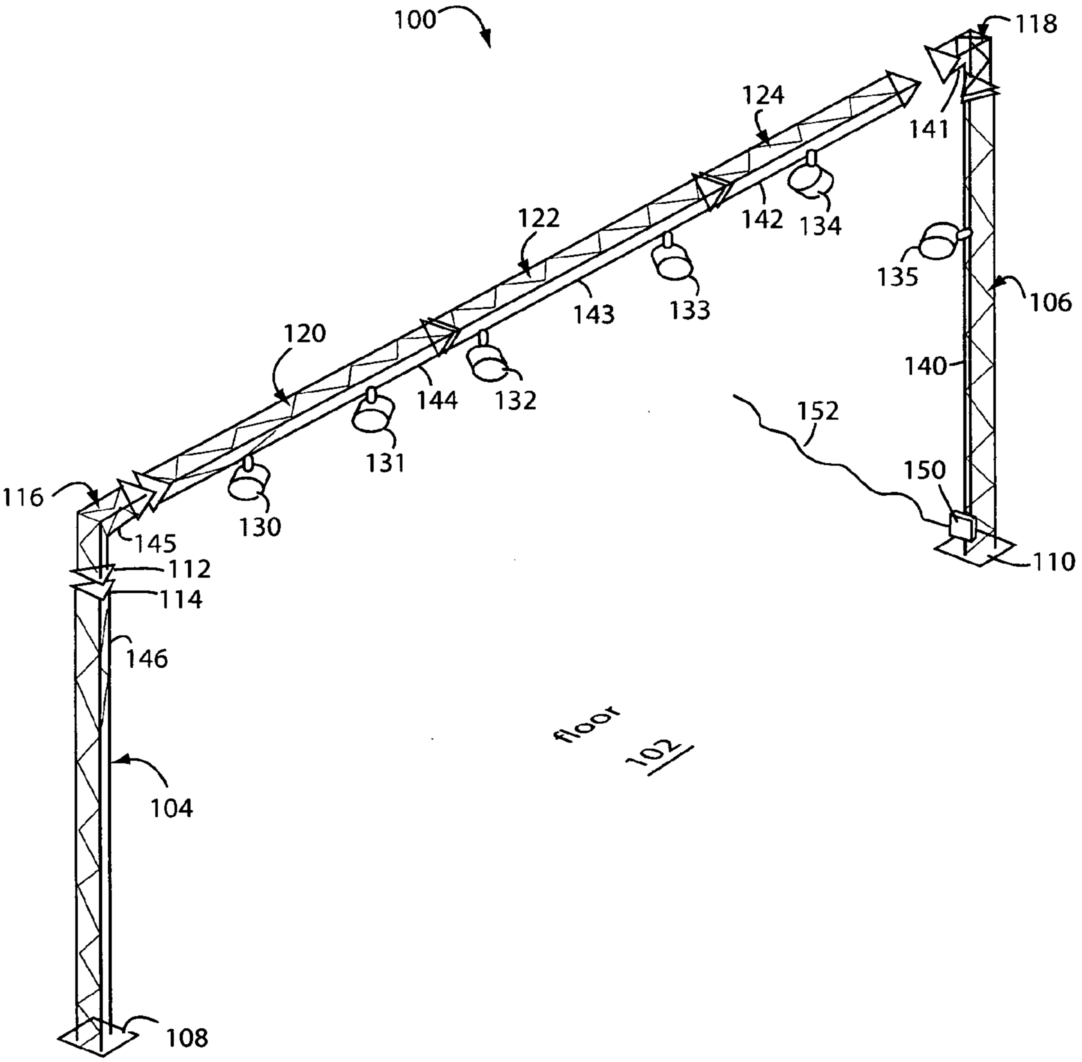
FIG. 1 is a perspective diagram of a stage lighting truss system embodiment of the present invention.

FIG. 1 represents a stage lighting truss system embodiment of the present invention, and is referred to herein by the general reference numeral 100. Truss system 100 may be arranged in many configurations suitable for the dimensions and uses of a floor 102. In one configuration, truss system 100 is made primarily from steel and comprises a pair of vertical supports 104 and 106 with base footings 108 and 110. A three-chord member, triangular construction is shown in FIG. 1, but 2-chord (I-beam), and 4-chord (square) truss pieces can also be used. A unique aspect is at least one of the chords has an electrical track and fixture slot within to accommodate and power low-voltage lighting heads.

Each section is terminated with a welded triangular flange, e.g., 112 and 114. These bolt together and allow the modular assembly needed to custom configure each application of the system. An interconnector, shown in later Figures, allows daisy-chaining of the electrical power from one powered truss chord to the next.

A pair of 90-degree corner connectors 116 and 118 provide mounts overhead for a span of three horizontal truss sections 120, 122, and 124. Typically, three such sections would provide a 30-foot span. For example, low-voltage lighting heads 130-135 can be installed anywhere along the powered truss chord 140-146 using a fixture slot in the steel tubing that provides mechanical support aloft and electrical contact access to the electrified power busses inside.

A step-down transformer 150 provides low-voltage, 12/24 VAC, power converted from a 120/240 VAC power line cord 152. The low voltage connection from the step-down transformer can be detachable through the track fixture slot like the lighting heads, or wired-in for high amperage through a heavier feed cable connection.

Figure 2A:
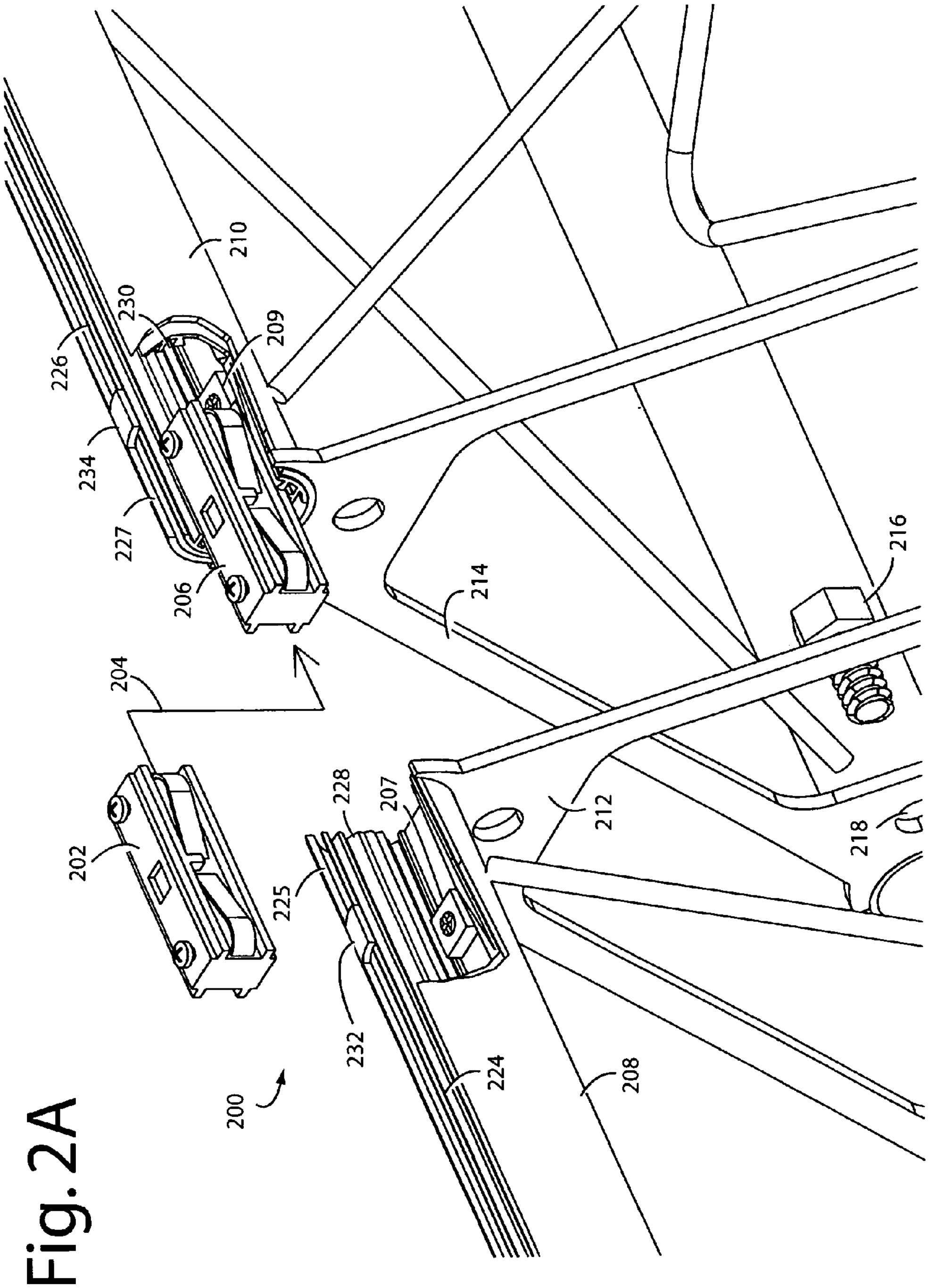
FIG. 2A is a close up perspective exploded assembly view showing how typical truss sections are assembled together with interconnecting plugs for the low voltage power daisy-chaining.

FIG. 2A shows a close-up of the connection between sections, e.g., between flanges 112 and 114 in FIG. 1, and is referred to by the general reference numeral 200. Connection 200 requires an electrical interconnector 202 with opposite male plug ends. During on-site assembly, an insertion motion 204 puts this in place in one truss section end, as shown here by another interconnector 206.

A riveted stop 207, visible here only in the end of a powered truss chord 208 prevents the interconnector 206 from going in too deep. Its rivet prevents field personnel from assuming this piece can be adjusted or disassembled by them.

A matching female socket here aligns with a similar powered truss-chord 210 and female socket in an adjoining truss section. These two truss sections are joined by matching welded flanges 212 and 214, and all are made of steel for strength. A typical machine bolt 216 passes through holes 218 and is threaded and tightened to a machine nut. Slots 224-227 provide access for lighting heads and transformers into the internal power tracks 228 and 230. The internal power tracks 228 and 230 are disposed in each of the powered truss-chords 208 and 210 and are electrically bridged by interconnector 206.

It's advantageous to have the longest fixture slots 224 and 226 possible, and these are most practical when the chords are comprised of steel. Slots 225 and 227 are each just a few inches long and are divided by webbings 232 and 234 from slots 224 and 226. The webbings 232 and 234 help maintain the overall strength of the tube sections in which they are disposed.

Figure 2B:
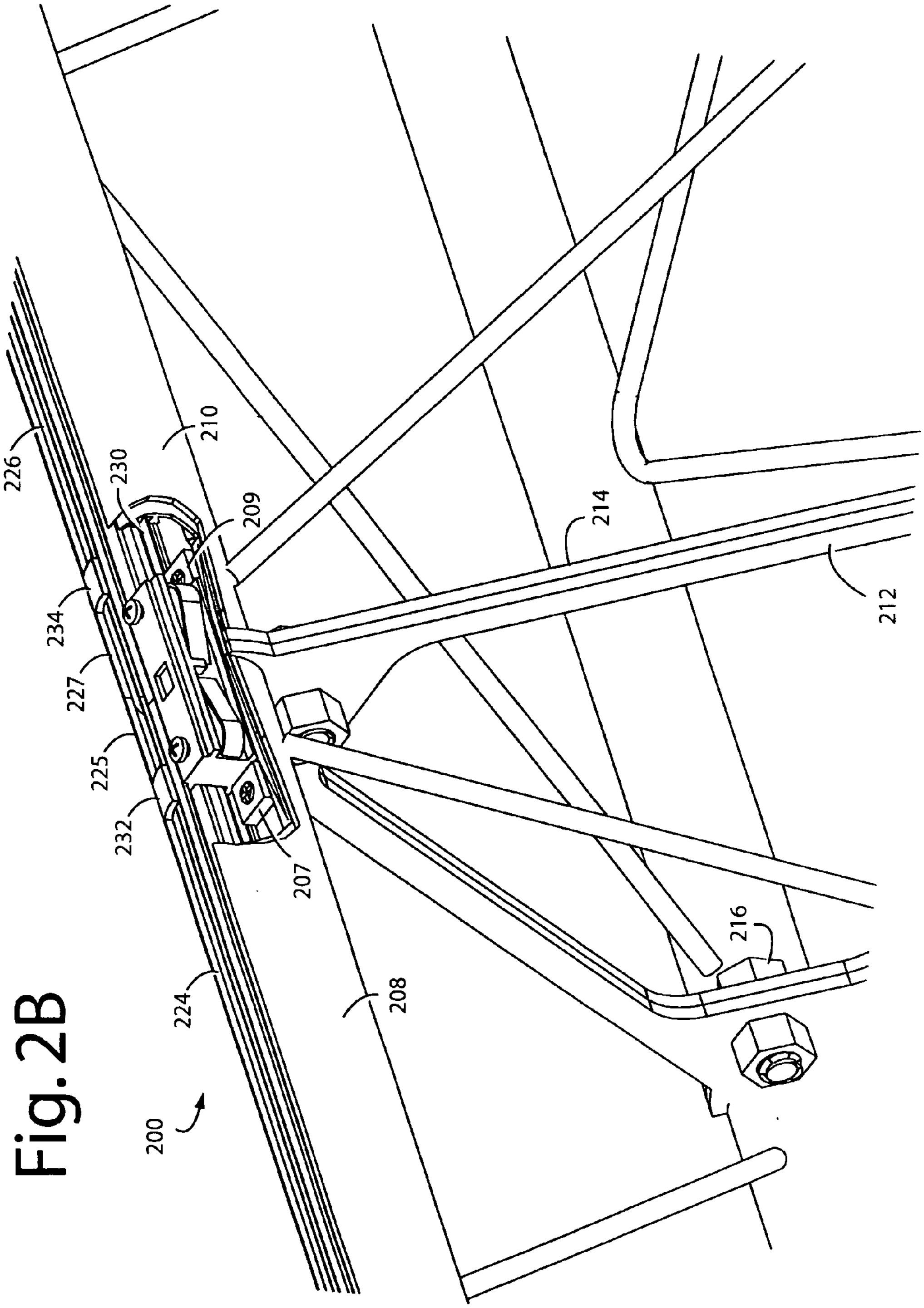
FIG. 2B is a close up perspective view showing how typical truss sections look after being assembled together.

FIG. 2B shows the results of assembling connection 200.

Figure 3A:
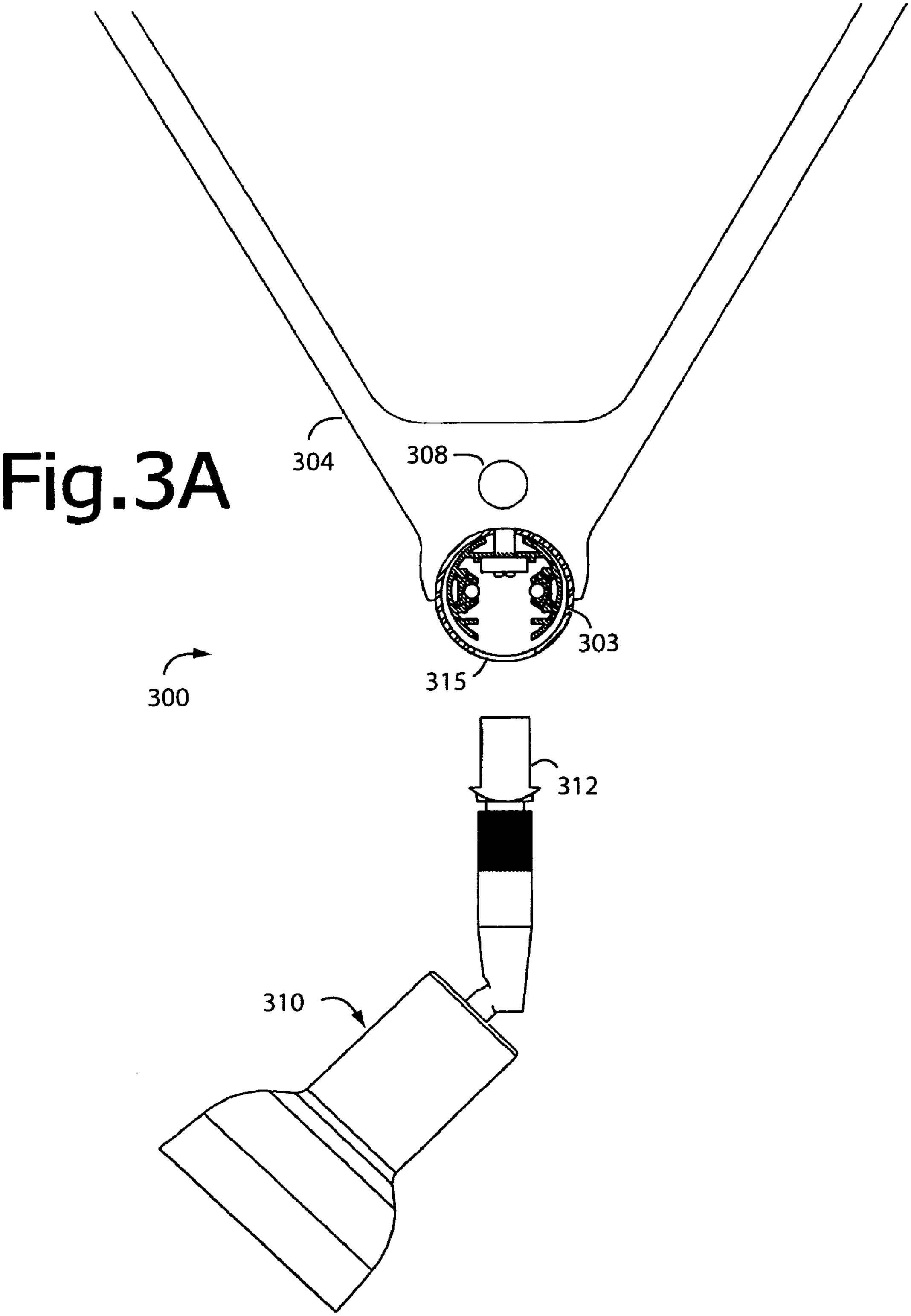
FIG. 3A is an end view of a truss section with one of its three main chords outfitted with power busses and slotting to accommodate lighting heads, transformers, and other devices, as in FIG. 1.
Figure 3B:
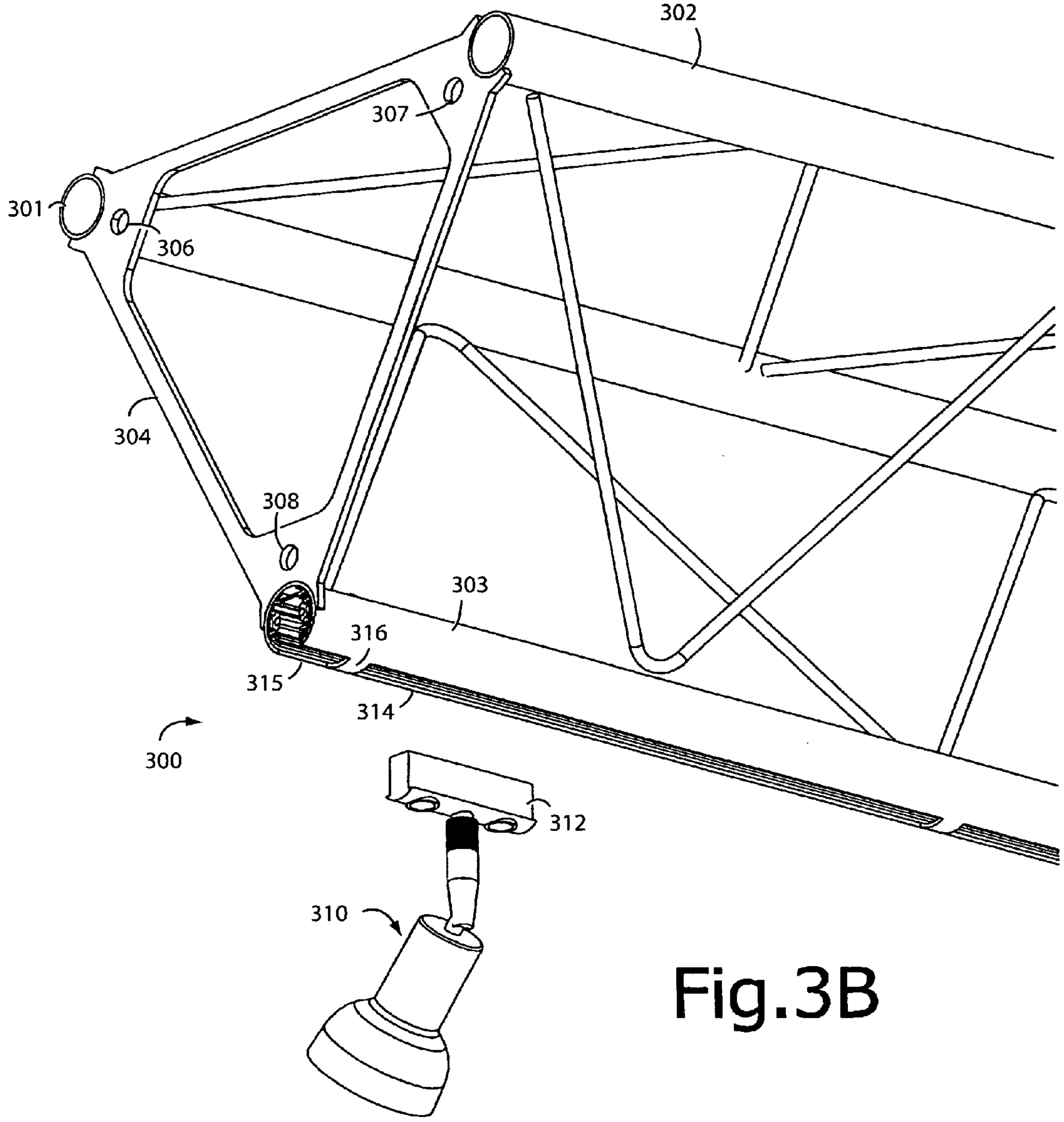
FIG. 3B is a perspective view of the truss section shown in FIG. 3A.

FIGS. 3A and 3B represent a flange end of a three-chord truss 300. In FIG. 3B, three steel chords 301-303 are welded at their ends in a triangular pattern to a flange 304. Bolt holes 306-308 are provided to fasten this end to another adjoining truss section. Truss chord 303 is a powered truss chord and can receive a lighting head 310 and track connector 312 through a near continuous fixture slot 314. An end slot 315 allows for testing and inspection of any interconnecting plugs after assembly.

How much of the length of powered truss-chord 303 that can be slotted is limited by the weakening effects a continuous fixture slot would have. If steel were used for the tubing, the slotting would have less of an effect on the truss strength. Such slots can be cut from the steel tubing by industrial lasers, which allow for clean straight cuts of any shape. The slotting 314 and 315 in the steel tubing may be interrupted at the ends and every three or four feet to allow a web 316 to brace together the open pieces. Other metals, of course, can be used for the tubing and flanges.

Figure 4A:
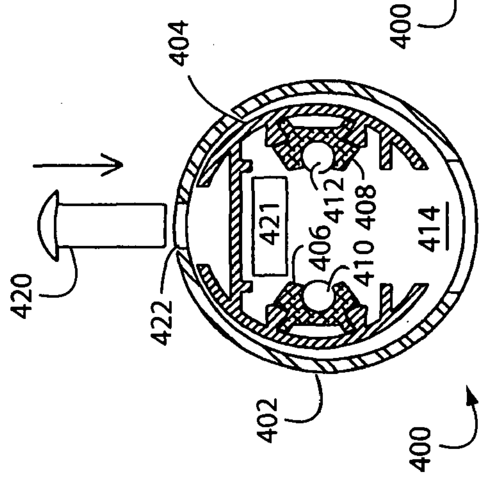
FIGS. 4A-4C are end views and a perspective of a powered truss chord, as in FIGS. 3A and 3B, which has aluminum extrusions and insulator supports for two-wire power bus bars and slotting in the steel truss chord tubing to accommodate lighting heads as in FIG. 1.
Figure 4B:
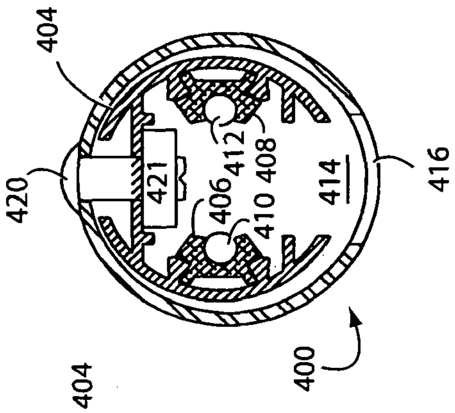
Figure 4C:
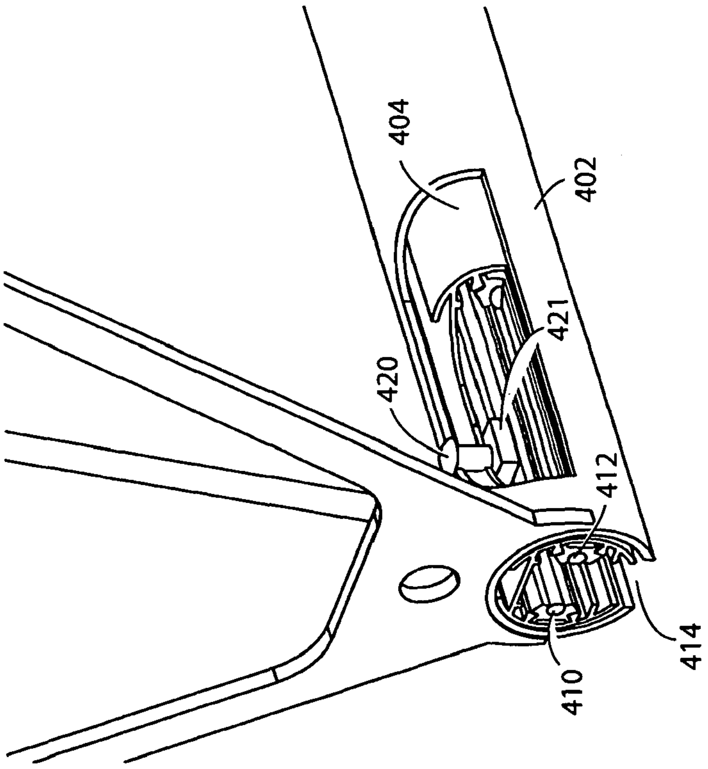

FIGS. 4A-4F provide more details of what's inside a powered truss chord 400. It includes a steel outer tubing 402 in which is disposed an aluminum extrusion 404. Such, in turn, provides for two insulator supports 406 and 408 as seen in FIGS. 4A-4C. These can be made of any good electrical insulating material that is also mechanically strong and able to resist breaking and cracking, e.g., polyvinyl chloride (PVC) and other plastics. A pair of copper bus bars 410 and 412 carry a low voltage current to power track lighting and other devices. The electrical contact can be made directly inside anywhere along the exposed bars. An access fixture slot 414 in extrusion 404 allows a lighting head connector, e.g., 312 in FIGS. 3A and 3B, to be inserted through to make contact with power buss bars 410 and 412. A similar, matching fixture slot 416 is cut into the adjacent section of the steel main truss chord 402.

Figure 4F:
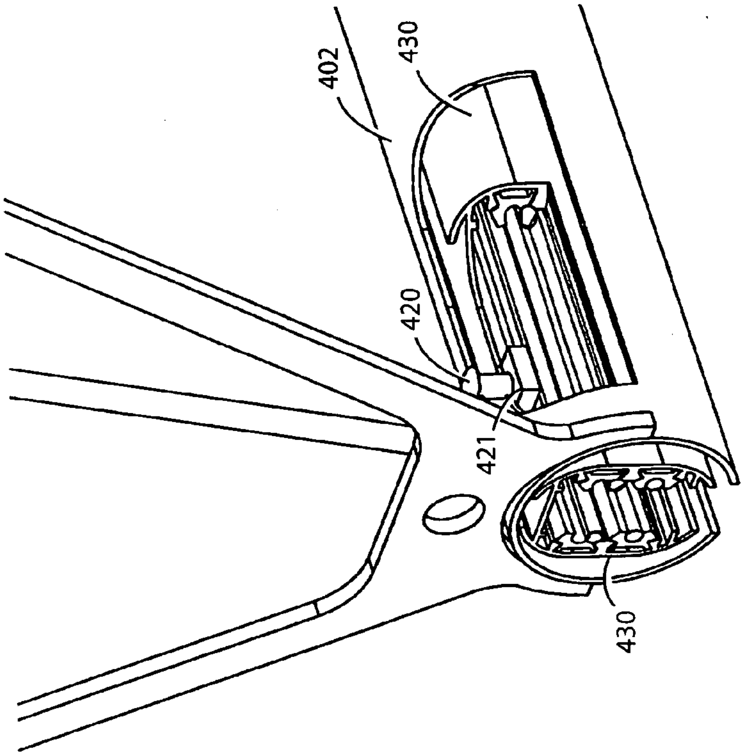
FIGS. 4D-4F are end views and a perspective of a powered truss chord, as in FIGS. 3A and 3B, which has aluminum extrusions and insulator supports for four-wire power bus bars and slotting in the steel truss chord tubing to accommodate two circuits of lighting heads as in FIG. 1.

The aluminum extrusion 404 is permanently secured inside powered truss-chord 402 with a rivet 420 and square nut stop 421 through a hole 422. FIGS. 4C and 4F use drawing cutaways in tubing 402 to better show the details of rivet 420 and square nut stop 421.

Figure 4E:
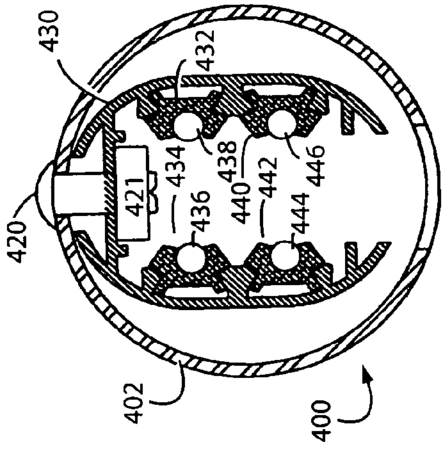
Figure 4D:
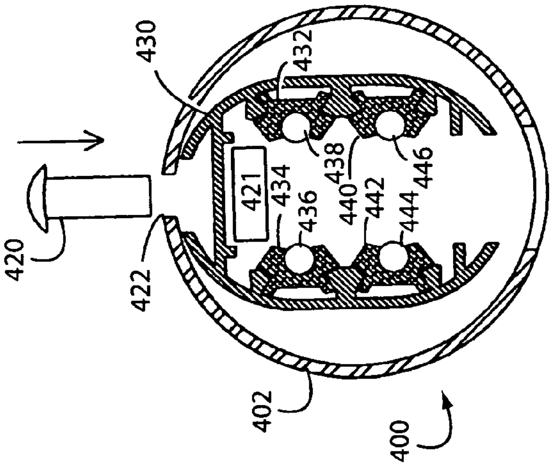

FIGS. 4D-4F include instead a 4-wire bus bar extrusion 430, a first pair of insulators 432 and 434, a top pair of copper buss bars 436 and 438, a second pair of insulators 440 and 442, and a bottom pair of copper buss bars 444 and 446.

Figure 5A:
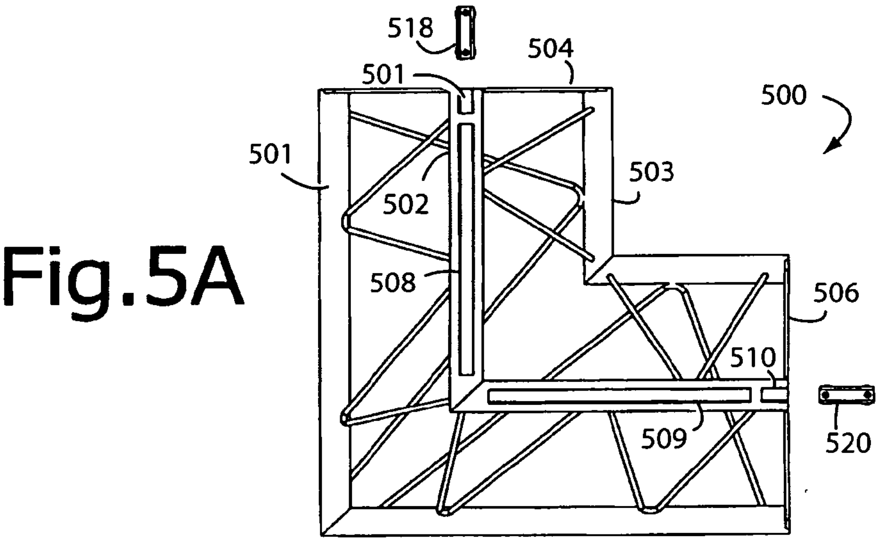
FIGS. 5A-5C are bottom, end, and top views of a 90-degree corner section that could be used with the parts shown in FIGS. 1-3A and 3B, inside the power tracks are interconnected through the sharp turns by internal wiring.
Figure 5B:
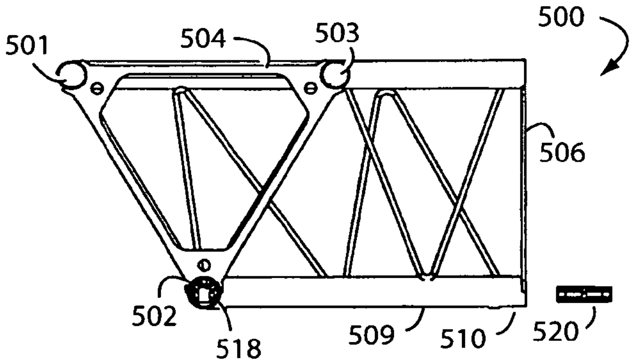
Figure 5C:
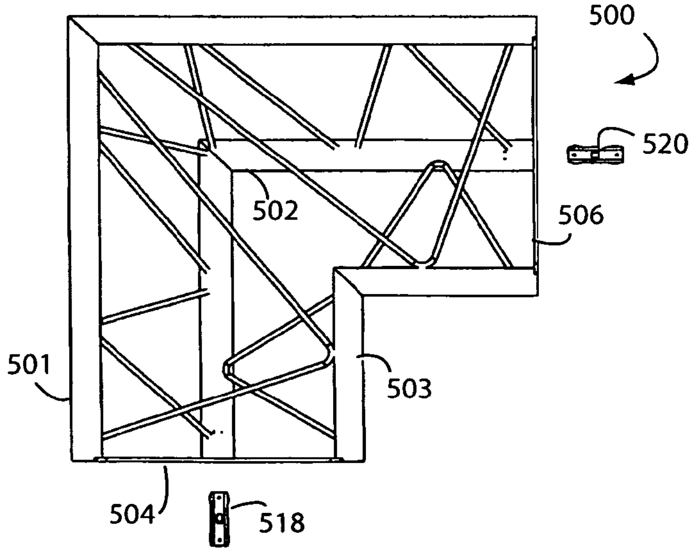

FIGS. 5A-5C represent one kind of 90-degree corner section that could be used with the parts shown in FIGS. 1-3A and 3B, and is referred to herein by the general reference numeral 500. Corner 500 comprises three main chords 501-503 and end-plate flanges 504 and 506, e.g., made of steel. Slots 507-510 are respectively cut in the outer edge of powered truss chord 502. Power busses are aligned with slots 508 and 510 and connected by a pair of wires through a plastic elbow 512. Male-male interconnectors 518 and 520 provide for power connections to the adjoining truss sections.

Figure 5D:
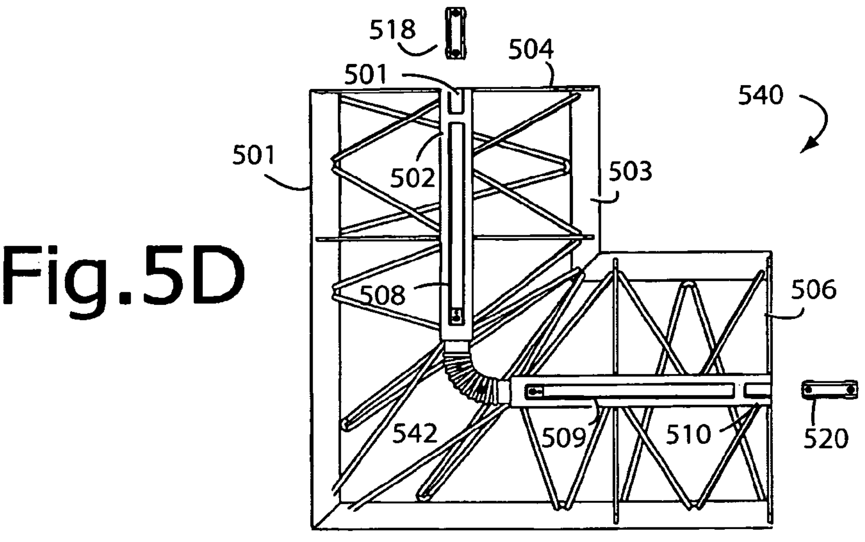
FIGS. 5D-5F are bottom, end, and top views of the 90-degree corner section like that of FIGS. 5A-5C, but with a hard plastic conduit connecting the power chord together and enclosing the interconnecting wiring.
Figure 5E:
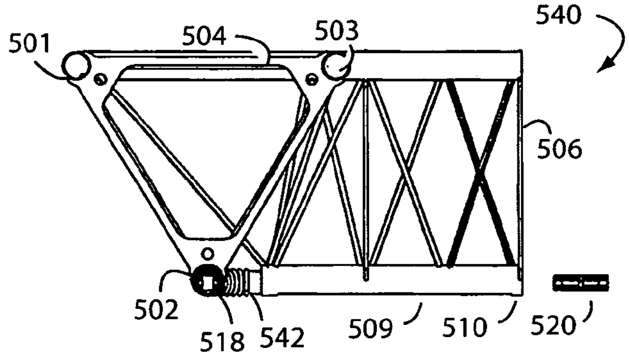
Figure 5F:
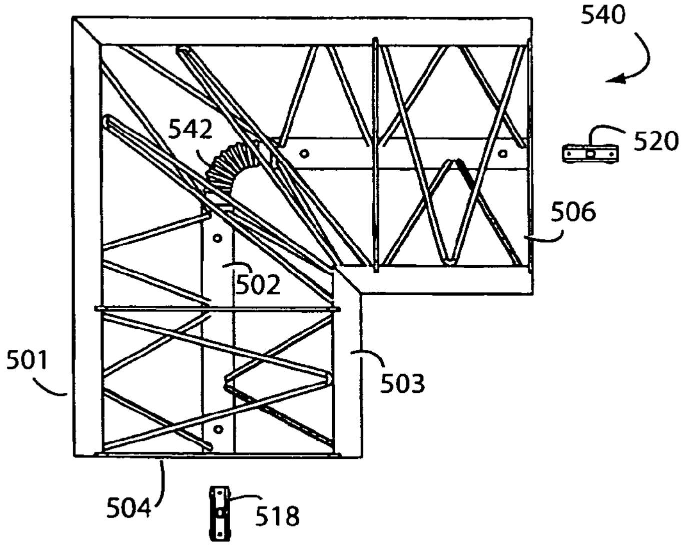

FIGS. 5D-5F are bottom, end, and top views of a 90-degree corner section 540 like those of FIGS. 5A-5C, but with a hard plastic conduit 542 enclosing interconnecting wiring. Slots 507-510 are disposed in the power chord 502 which provide access to power busses inside. End slots 507 and 510 allow for the inspection and testing of respective interconnectors 518 and 520.

Figure 6A:
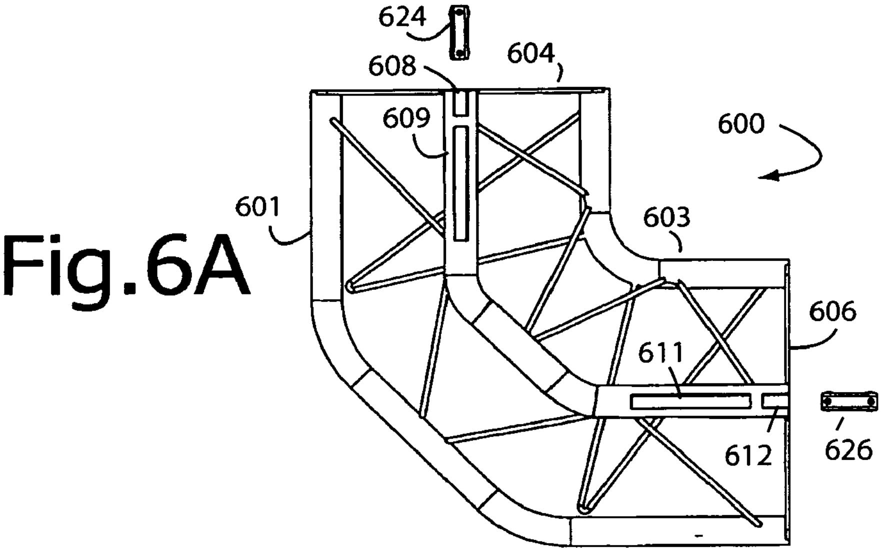
FIGS. 6A-6C are bottom, end, and top views of a 45-45-degree corner section that could be used with the parts shown in FIGS. 1-3A and 3B, the power tracks are interconnected through the 45-degree turns by internal wiring.
Figure 6B:
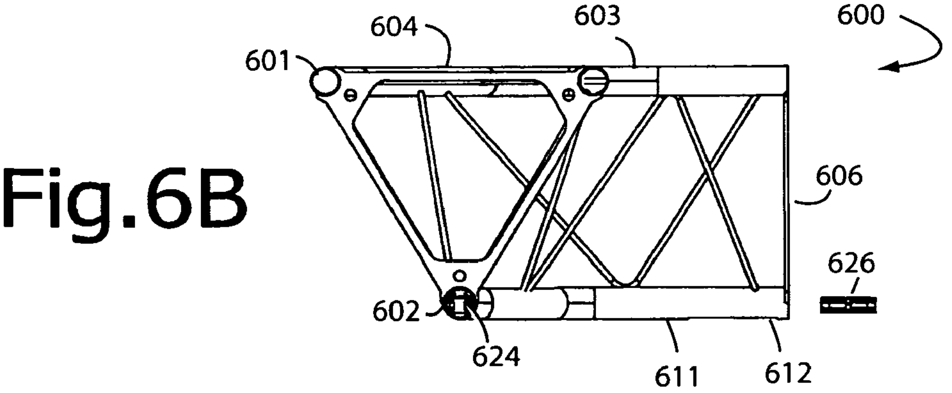
Figure 6C:
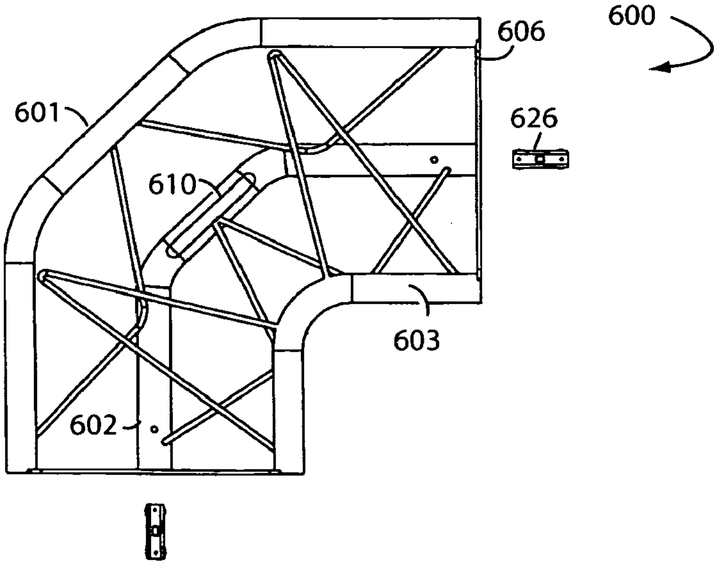

FIGS. 6A-6C represent a 45-45-degree corner section that could be used with the parts shown in FIGS. 1-3A and 3B, and is referred to herein by the general reference numeral 600. Corner 600 comprises three main chords 601-603 and end-plate flanges 604 and 606, e.g., made of steel. Slots 608-612, are cut into the corresponding straight runs of powered truss chord 602. Slot 610 allows a power cord to be threaded in the tubing to the outside. Power busses, like that shown in FIG. 4, are aligned and connected through the sharp turns by wire pairs. Male-male interconnectors 624 and 626 provide for power connections to the adjoining truss sections through matching female sockets.

Figure 7A:
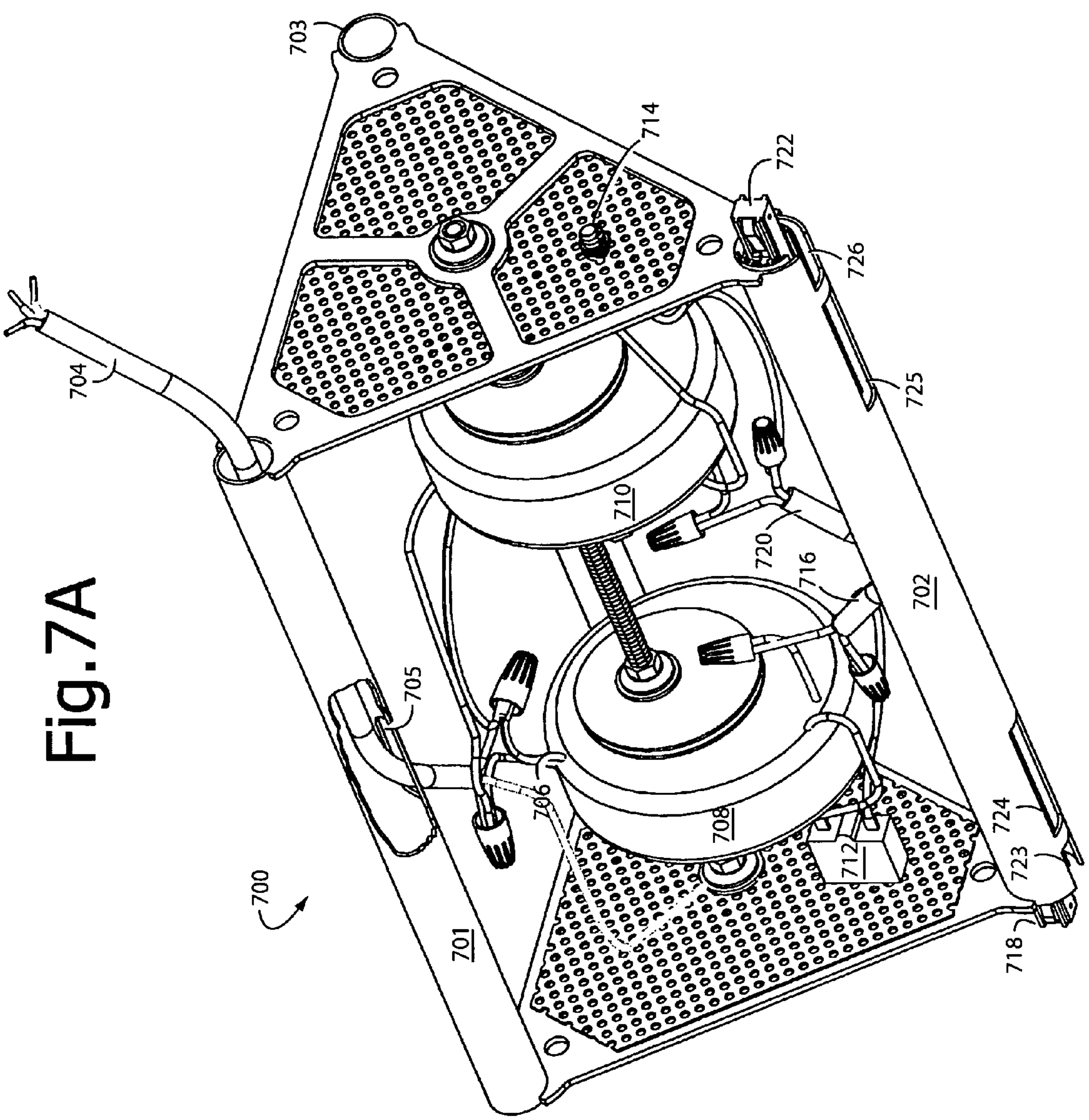
FIGS. 7A-7B are perspective diagrams of a transformer power truss section to convert 110/220 VAC utility power into 12-VAC low voltage for the power tracks in FIGS. 1-6A, 6B, and 6C.
Figure 7B:
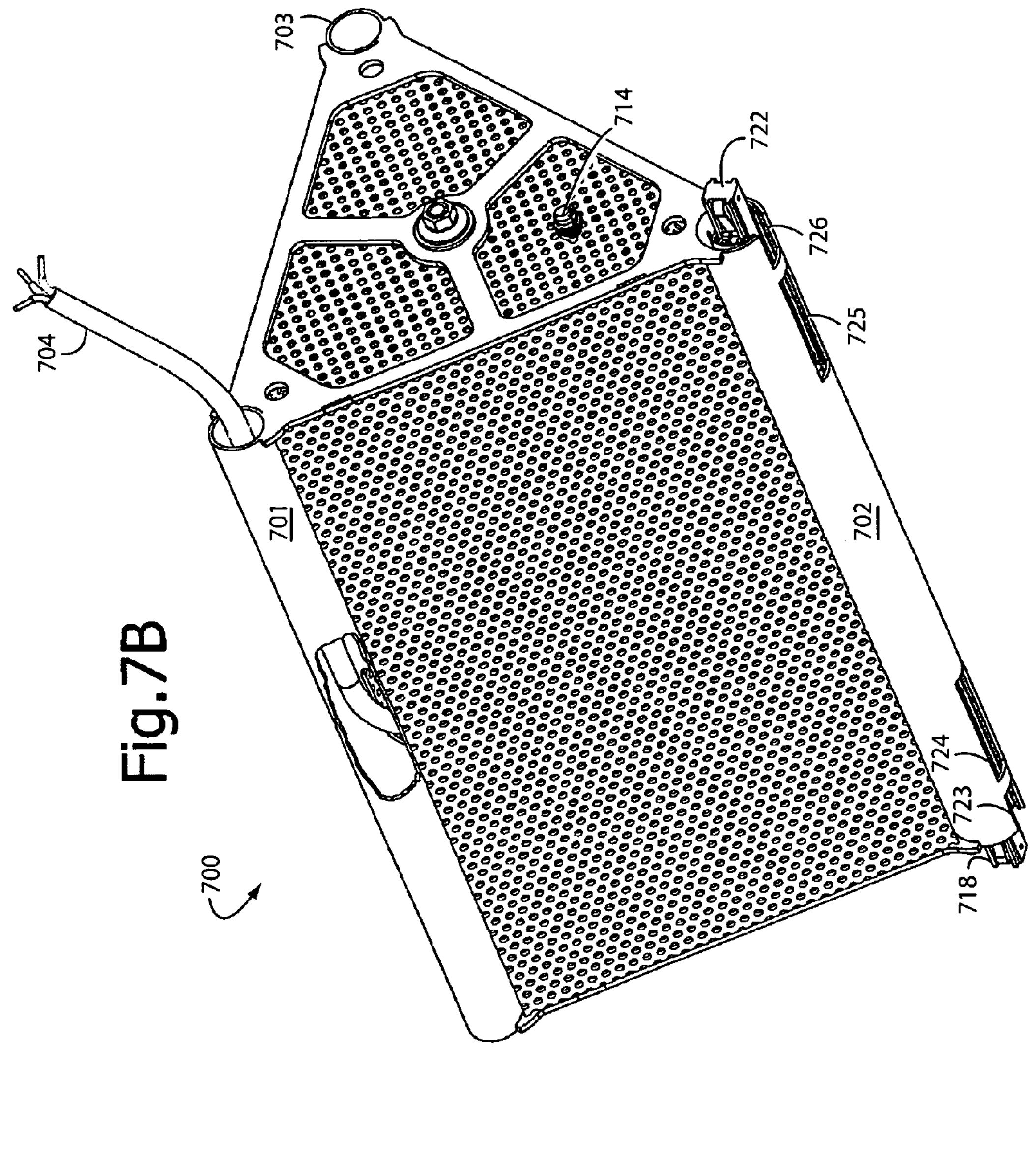

FIGS. 7A-7B represent a transformer power truss section 700 to convert 120VAC or 220VAC utility power into 12VAC low voltage for the power tracks in FIGS. 1-6A and 6C. The power truss section 700 comprises three truss chords 701-703, of which chord 702 carries the low voltage wiring and lighting tracks. A utility power supply pigtail 704 leads in through a slot 705 in chord 701 and has a ground connection 706. Two step-down transformers 708 and 710 convert, e.g., 120VAC to 12VAC and are respectively protected by circuit breakers 712 and 714. These each have a pushbutton reset (shown for 714) that a user can get to easily on the outside. A low voltage output from step-down transformer 708 connects through a wire lead 716 to an interconnector 718. Similarly, another low voltage output from step-down transformer 710 connects through a wire lead 720 to an interconnector 722. These respectively plug into a power track accessible through slots 723-726. FIG. 7B shows how the electrical components can be enclosed.

Figure 8A:
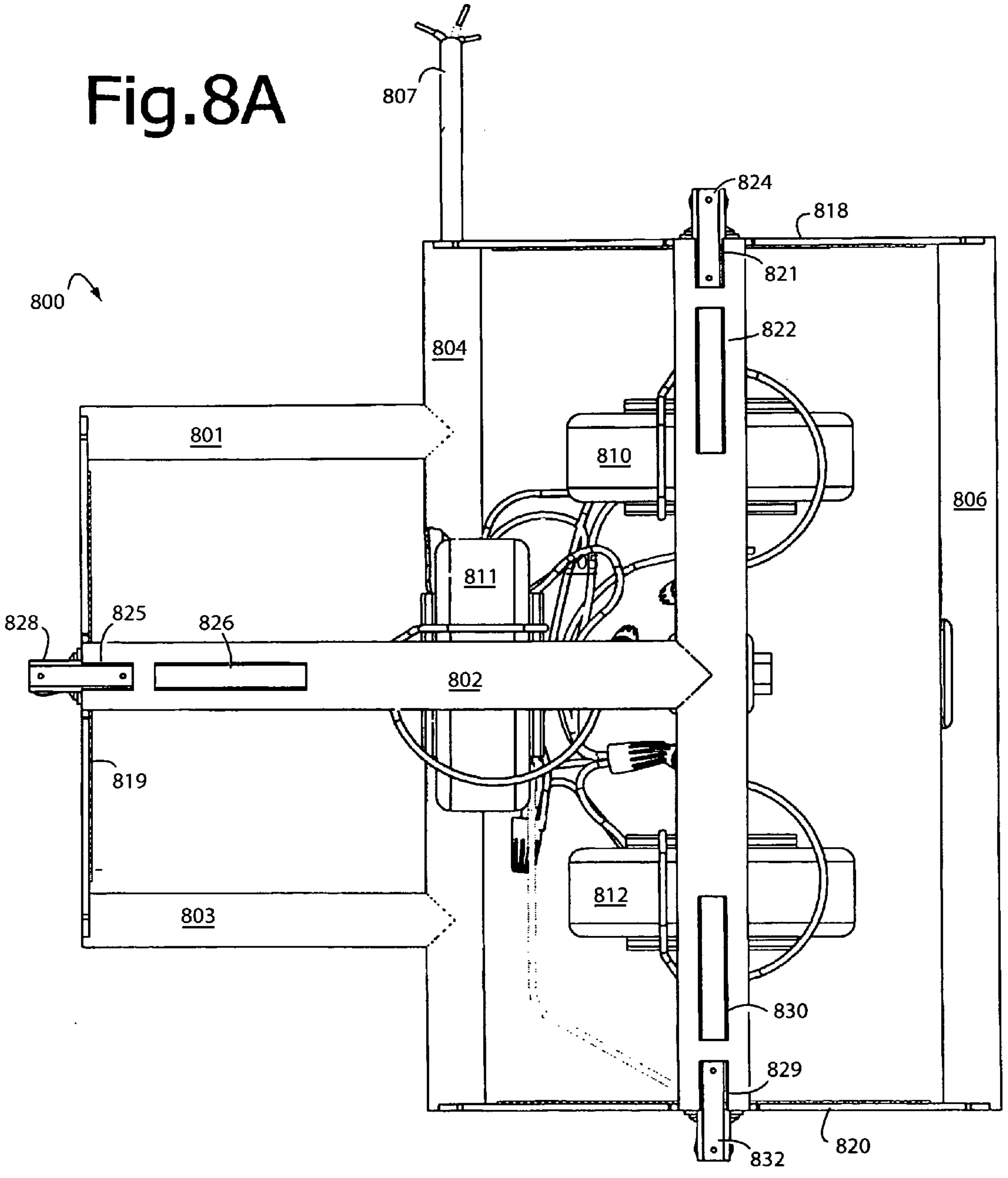
FIGS. 8A-8C are perspective diagrams of a transformer power truss T-section to convert 110/220 VAC utility power into 12-VAC low voltage for the power tracks in FIGS. 1-6A, 6B, and 6C.
Figure 8B:
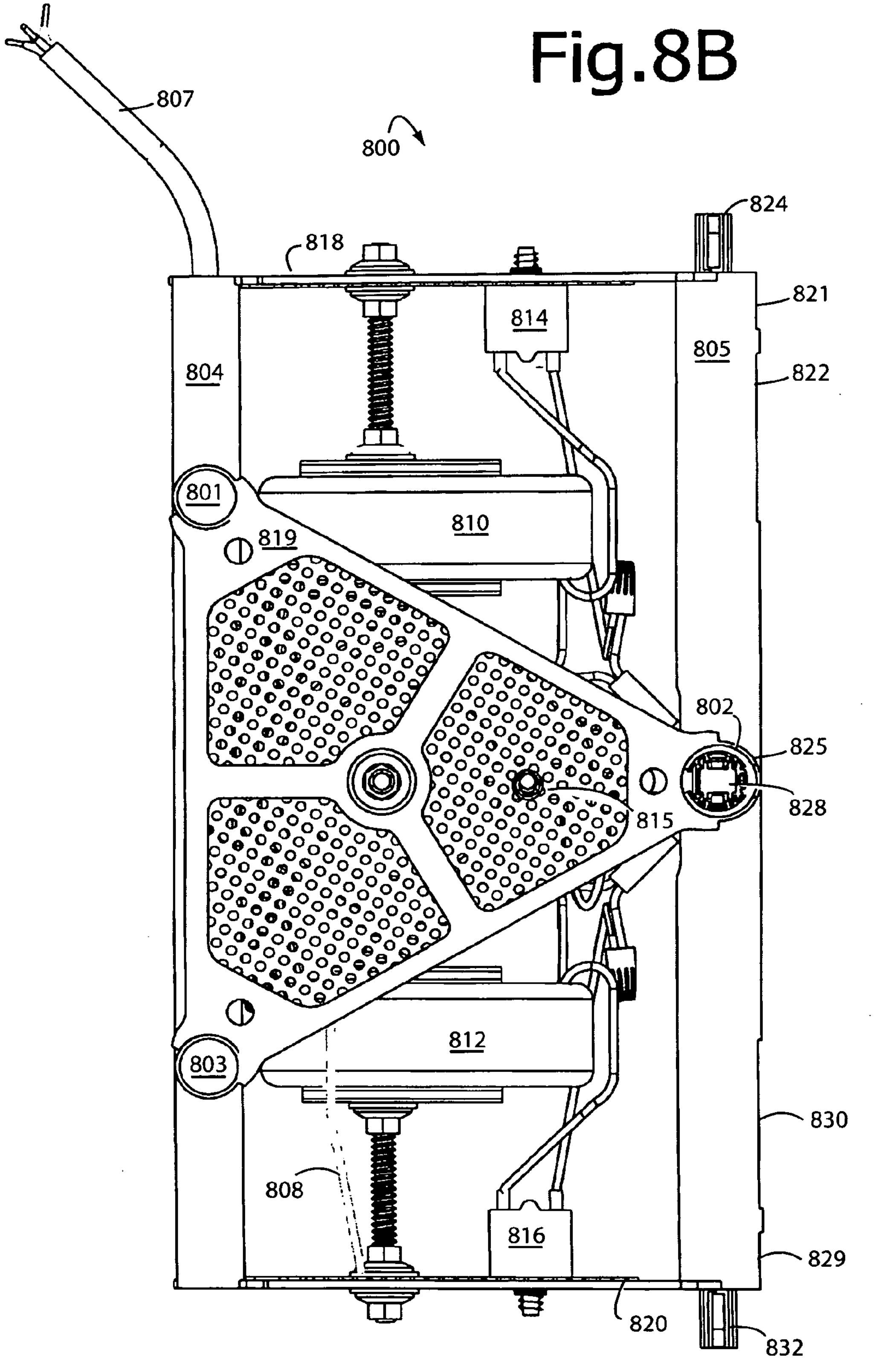
Figure 8C:
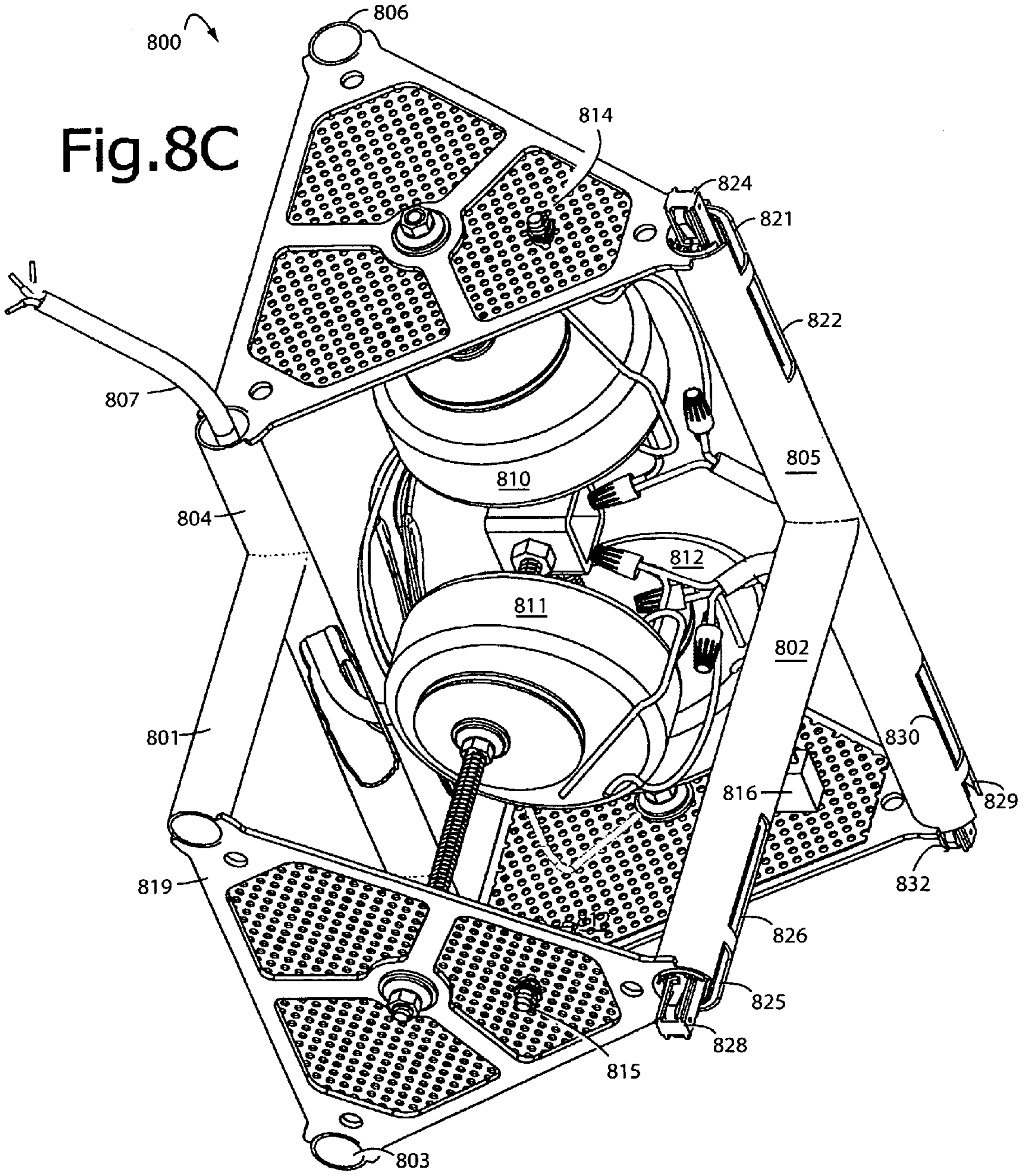

FIGS. 8A-8C represent a transformer power truss T-section 800 to convert 120VAC or 220VAC utility power into 12VAC low voltage, e.g., for the power tracks in FIGS. 1-6A, 6B, and 6C. The power truss T-section 800 comprises three truss chords 801-803 which T-intersect with three other truss chords 804-806. Chords 802 and 805 carry the low voltage wiring and lighting tracks. A utility power supply pigtail 807 leads in through chord 804 and has a ground connection 808. Three step-down transformers 810-812 convert, e.g., 110-VAC to 12-VAC, and are respectively protected by circuit breakers 814-816. These each have a pushbutton reset on the corresponding arm's flange plate 818-820 that a user can get to easily on the outside. A low voltage output from step-down transformer 810 connects through a wire lead to a power bus under an end slot 821, a fixture slot 822 and interconnector 824. Similarly, another low voltage output from step-down transformer 811 connects through a wire lead to a power bus under an end slot 825, a fixture slot 826 and to an interconnector 828. A third low voltage output from step-down transformer 812 connects through a wire lead to a power bus under an end slot 829, a fixture slot 830 and then to interconnector 832.

Figure 9:
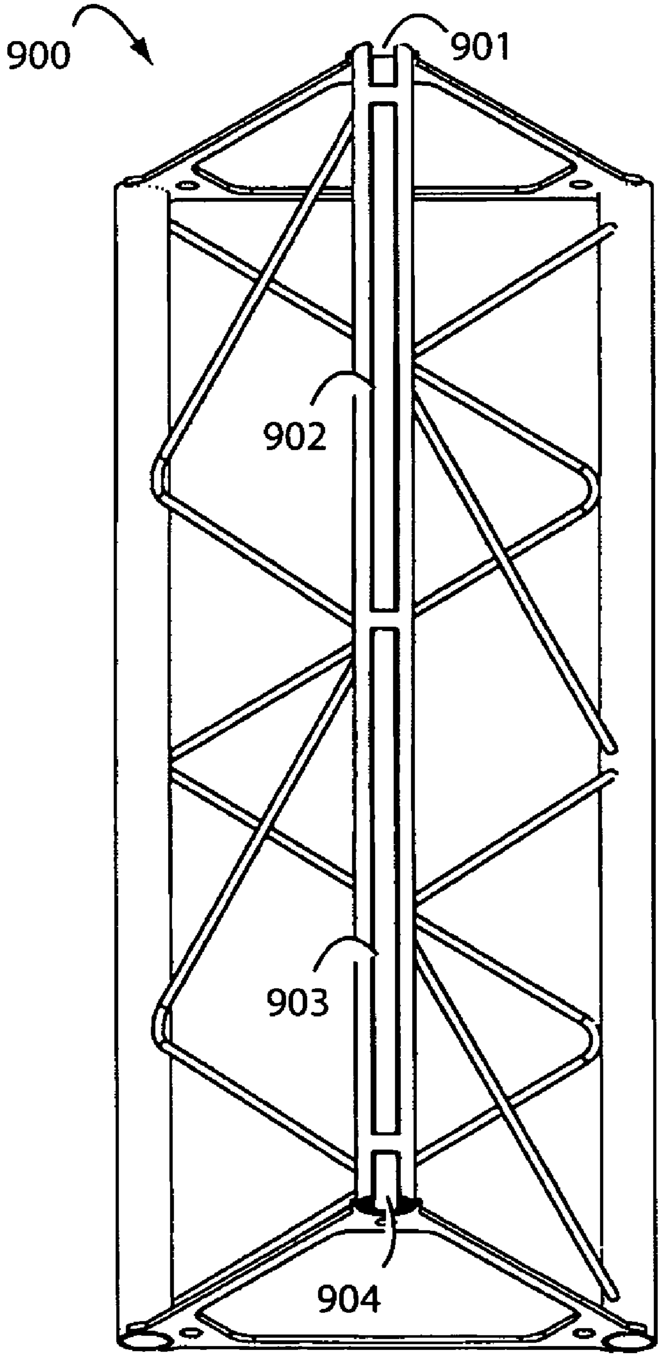
FIGS. 9-11 are perspective view diagrams of short, medium, and long lengths of straight truss sections, with two, three, and four power slots respectively.
Figure 10:
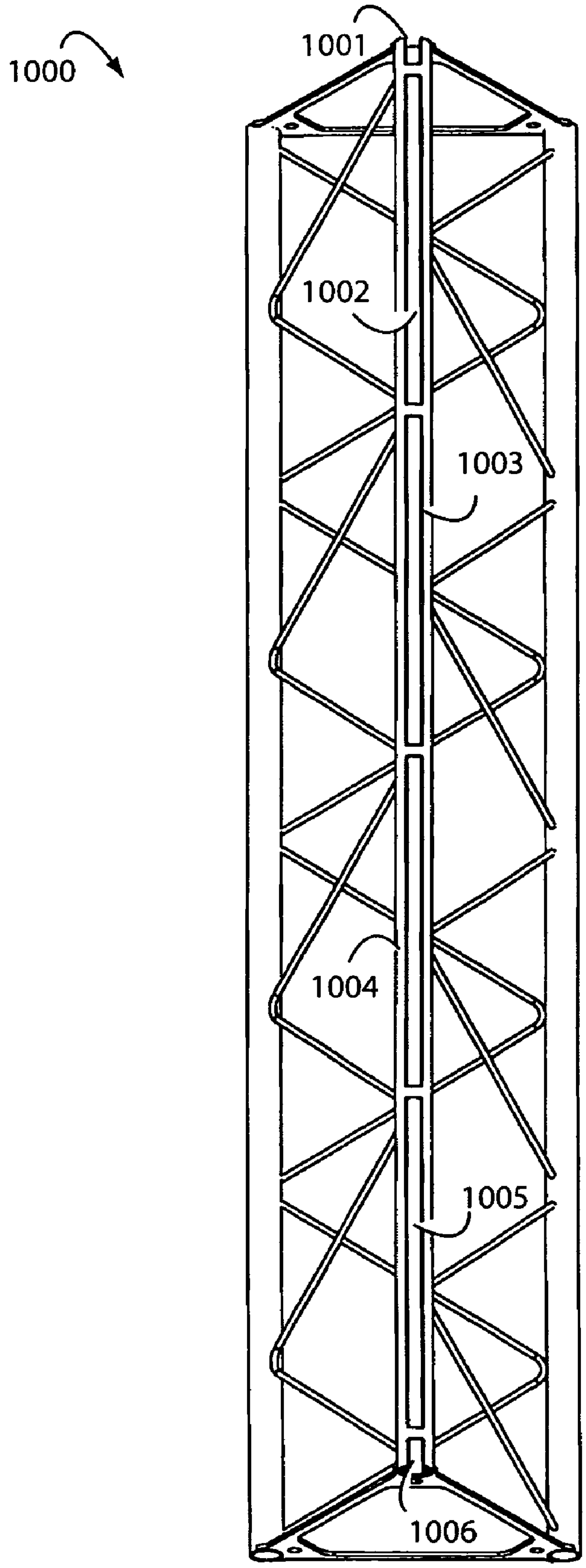
Figure 11:
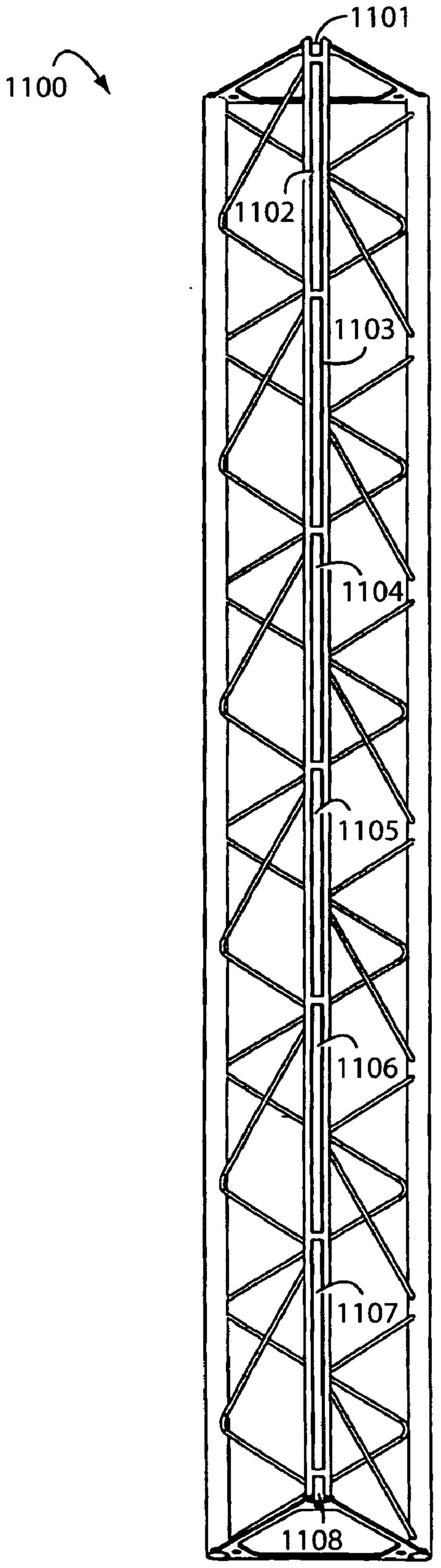

FIGS. 9-11 represent a short, a medium, and a long length of straight truss sections, referred to herein by the general reference numerals 900, 1000, and 1100. For example, these could be four, six, and eight feet long. In FIG. 9, straight truss section 900 has slots 901-904. In FIG. 10, straight truss section 1000 has slots 10001-1006. In FIG. 11, straight truss section 1100 has slots 1101-1108. The slots keep enough webbing between them to provide the structural strength necessary for the truss to provide good support without bending or flexing. For this reason, the longer lengths of straight truss sections need to be broken up in more slots, such that the webbing between them can be spaced no more than a few feet apart. For example, in FIG. 9, the maximum length of slots 902 and 903 would be several inches.

Figure 12A:
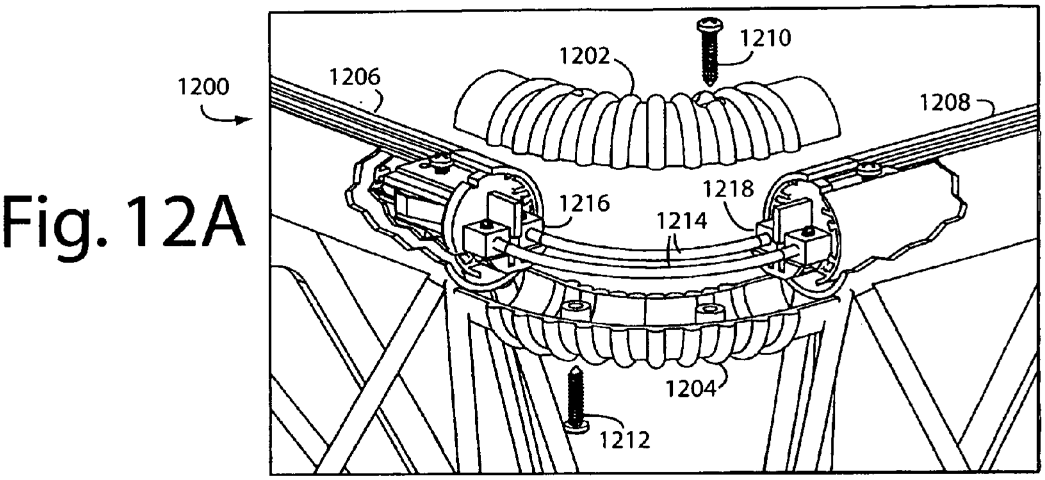
FIGS. 12A-12C are perspective view diagrams showing, in three steps, the assembly of a plastic elbow conduit and wiring for a corner truss section.
Figure 12B:
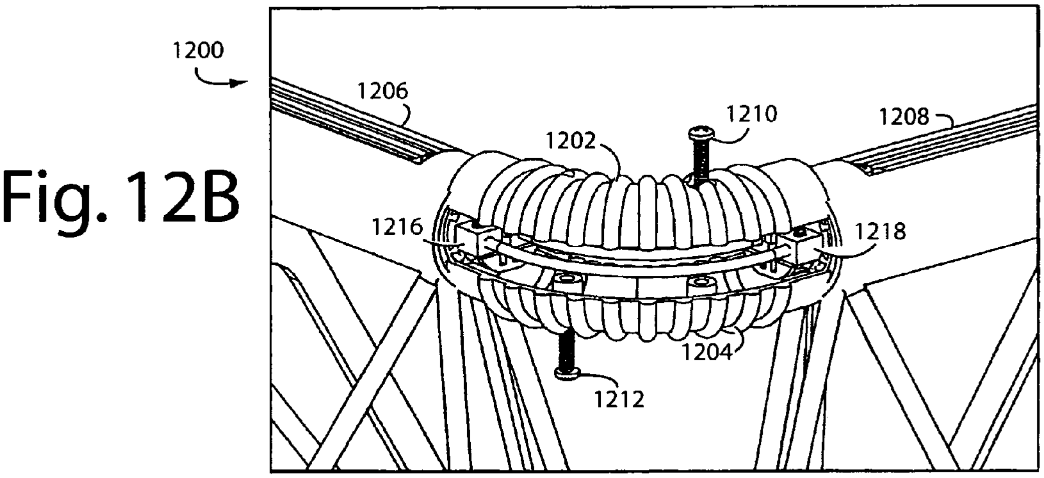
Figure 12C:
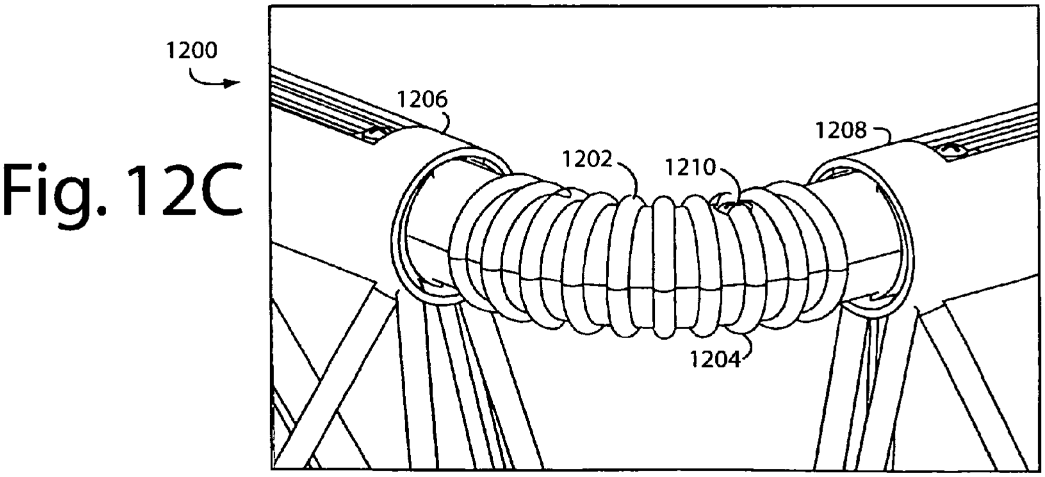

FIGS. 12A-12C provide more detail on the wiring and interconnection of corner truss sections, like that shown in FIGS. 5D-5F. A corner truss 1200 has two plastic elbow sections 1202 and 1204 that clamp over and join the ends of intersecting power truss chords and electric tracks 1206 and 1208. A pair of screws 1210 and 1212 holds them together. Inside, a pair of electrical wires 1214 connect respective ends 1216 and 1218 of the electric tracks 1206 and 1208.

Figure 13:
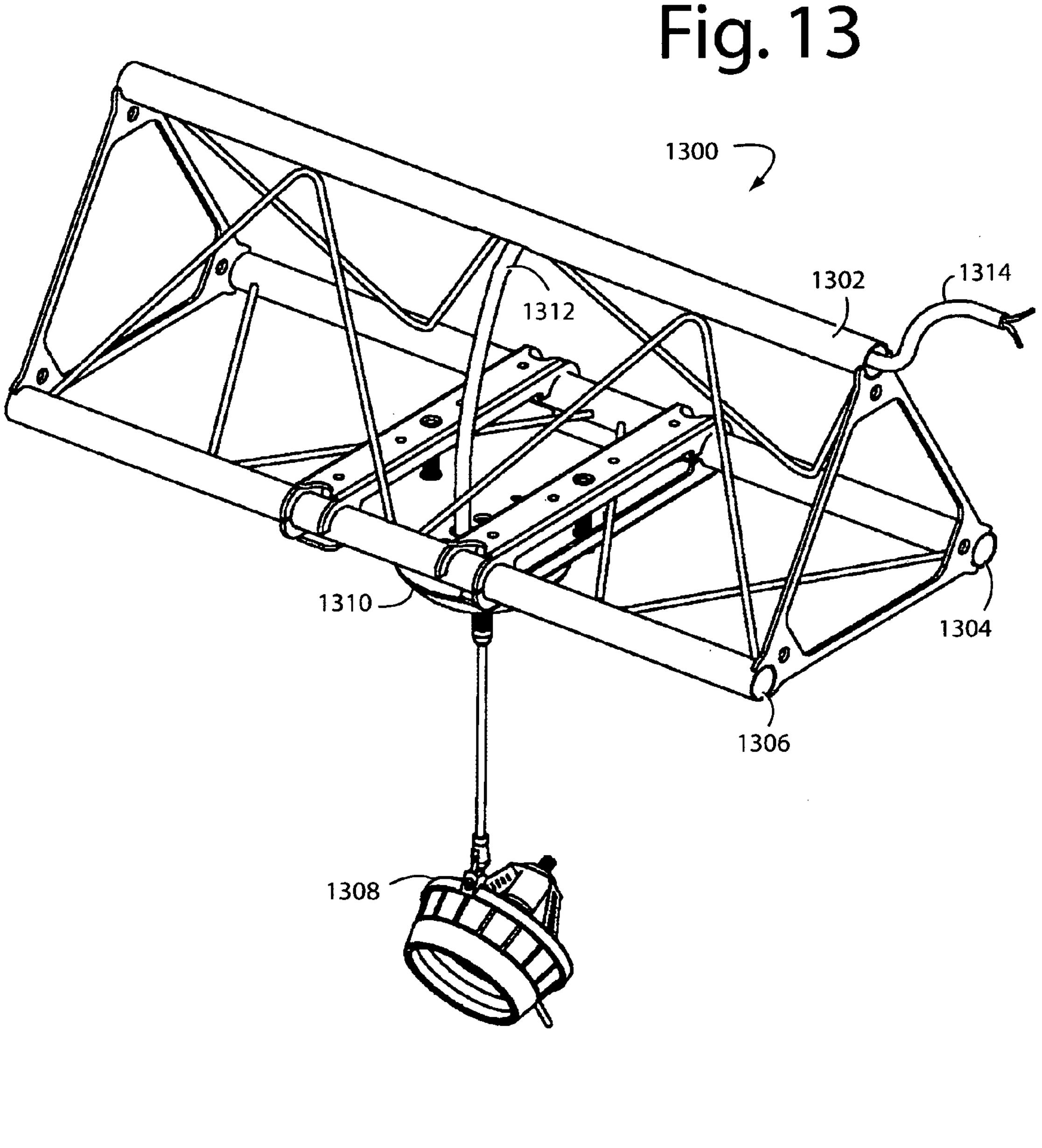
FIG. 13 is a perspective view diagram of a straight truss section with a utility line voltage powered pendulum lamp and strain relief support base.

FIG. 13 represents a straight truss section 1300 that does not include an electric track or power chord. Instead, three truss chords 1302, 1304, and 1306, are used to support a pendulum lamp 1308. A clamp on support base 1310 provides a decorative base and strain relief for a power cord 1312. This feeds into a slot in chord 1302 and out one end, emerging as a pigtail 1314 for connection to a power source and/or junction box.

Figure 14:
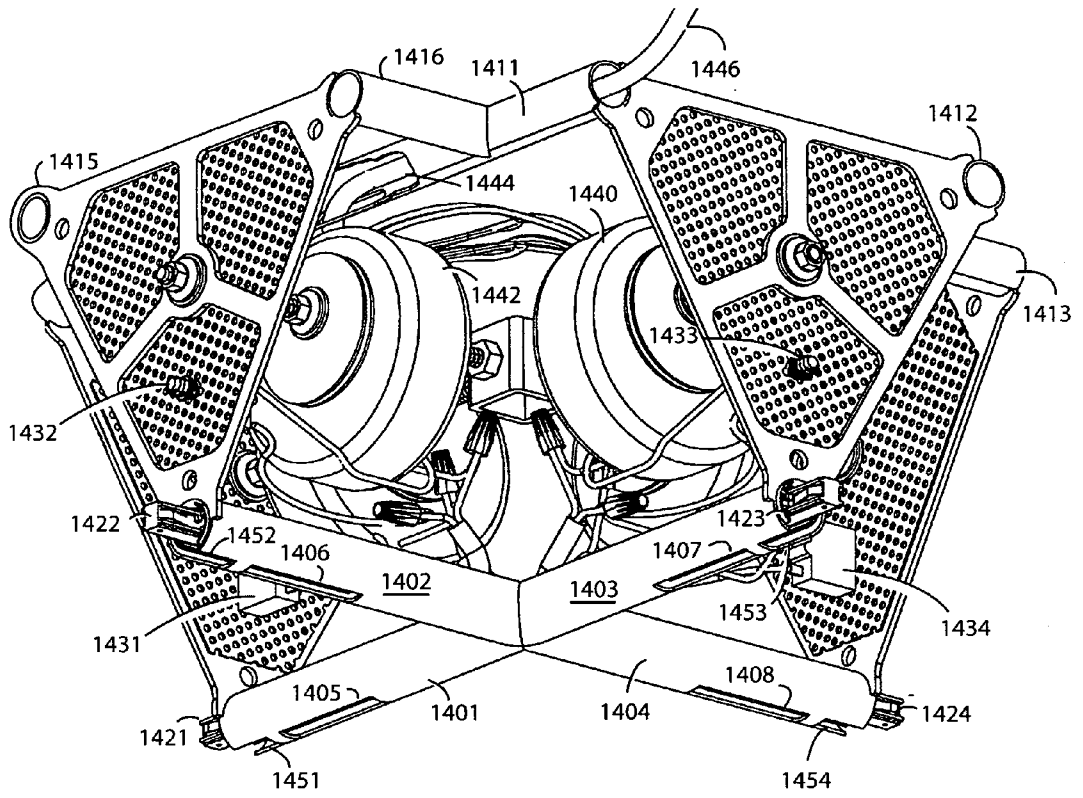
FIG. 14 is a perspective diagram of a 4-transformer power truss 4-way cross connection to convert 110/220 VAC utility power into 12-VAC low voltage for the power tracks in adjoining truss sections.

FIG. 14 represents a 4-way truss connecting section 1400 that includes four arms 1401-1404 and a power chord with slots 1405-1408. Other chords 1411-1416 are welded together from tubing to form the basic three-chord structural member with 4-way intersection. Interconnectors 1421-1424 provide for electrical, low voltage connections to other truss sections. Each has a respective circuit breaker 1431-1434 that can be easily reset with a pushbutton by a user if a circuit fault occurred. Four step-down transformers are represented by 1440 and 1444, and receive utility power through a slot 1444 using a power cord and pigtail 1446. Cover screens would normally be installed to protect workers from electric shock, and are not shown here so the internal components can be understood and described. End slots 1451-1454 provide access and inspection of interconnectors 1421-1424.

Figure 15A:
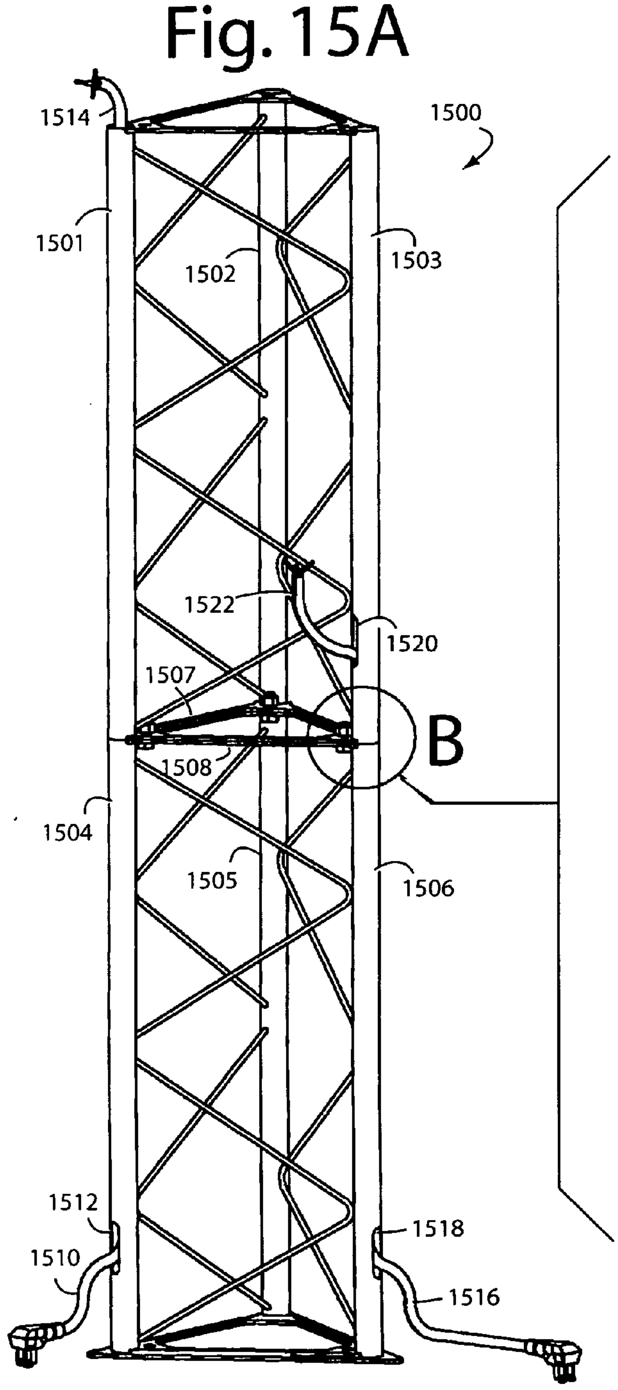
FIGS. 15A and 15B are perspective view diagrams of two lengths of straight truss sections, showing how slots can be used to thread a power cord.
Figure 15B:
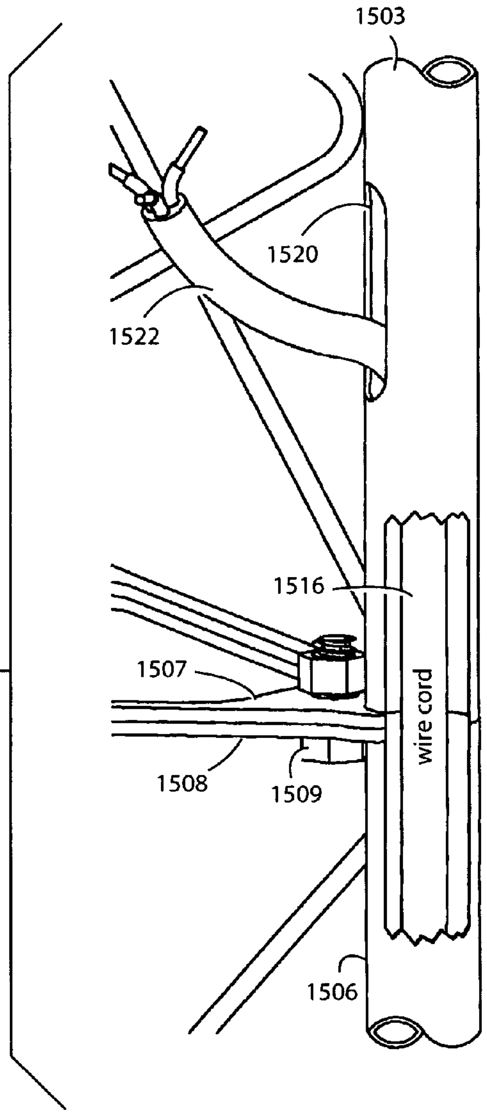

FIGS. 15A and 15B represent a truss section 1500 that illustrates how the utility power cords can be dressed inside the truss chords. A first straight truss has three chords 1501-1503 that join with a second straight truss section with three matching truss chords 1504-1506. These all have open ends that allow cords and other wiring to pass inside between them, and the truss sections bolt together with end flanges like 1507 and 1508 using fasteners like 1509. A first power plug and cord 1510 passes up inside chords 1504 and 1501 through a slot 1512. A pigtail 1514 appears at the open end of chord 1501. Another power plug and cord 1516 similarly passes up inside chords 1506 and 1503, but exits through a slot 1520 to appear as pigtail 1522.

FIG. 16 represents a corner assembly 1600 that uses a radius elbow section to join straight truss sections. The way the utility power wiring is threaded in the truss chord tubing members is the focus of this illustration. A first straight truss section has straight chords 1601-1603 that align with three corresponding radius chord members 1604-1606 in an elbow truss. These, in turn, connect to respective chords 1607-1609 in a second straight truss section. A detail B shows how flanges 1610 and 1611 mate and are bolted together. A power plug and cord 1620 threads into a slot 1622 in chord 1607 and runs up along inside chords 1604 and 1601. It is seen in a cutaway as cord 1624 and exits a slot 1626 with a pigtail end 1628. Standard twist-on wire connections can be used to complete the electrical connection, e.g., to a step-down transformer or line-voltage lamp. Cord 1624 is shown passing through a butt-joint 1630.

Although particular embodiments of the present invention have been described and illustrated, such was not intended to limit the invention. Modifications and changes will no doubt become apparent to those skilled in the art, and it was intended that the invention only be limited by the scope of the appended claims.

The invention claimed is:

1. A lighting truss system, comprising: a truss section with a plurality of powered main truss chords between end flanges;

a plurality of fixture slots disposed along an outside length of said powered main truss chords; a pair of end slots outboard of the fixture slots and inline with the fixture slots, and which produce an opening at each end of the powered main truss chords; a plurality of extruded aluminum supports disposed inside said powered main truss chords; a pair of power buss bars supported inside the extruded aluminum supports by insulator supports and accessible on one side through one of the fixture slots; and a pair of fasteners each for fixing corresponding ends of the extruded aluminum supports inside the powered main truss chords.

2. The truss system of claim 1, further comprising: a male-male plug for interconnecting exposed open ends of the powered main truss chords between adjoining said end flanges, and which slide in under respective one of the end slots, and that are indexed and stopped in position by corresponding one of the fasteners.

3. The truss system of claim 1, further comprising:

the plurality of fixture slots disposed along said outside length of said powered main truss chords, and the extruded aluminum supports disposed inside said powered main truss chords, and the pair of power buss bars supported inside the extruded aluminum supports by insulator supports; wires interconnecting at least two pairs of the power buss bars;

and sockets formed at each end of the powered main truss chords at said end flanges providing for a male-male plug for interconnecting exposed open ends of the powered main truss chords between adjoining said end flanges.

4. The truss system of claim 1, further comprising:

a step-down transformer for providing low-voltage from a utility connection to the pair of power buss bars through one of the fixture slots.

5. The truss system of claim 1, further comprising:

a number of lighting heads connected through the fixture slots to the power buss bars and positionable anywhere along the fixture slots.

6. A truss transformer power T-section, comprising:

a truss T-section with a plurality of low-voltage powered main truss chords between three end flanges; a plurality of slots disposed along an outside length of said powered main truss chords; a plurality of extruded aluminum supports disposed inside said powered main truss chords relative to the slots;

a pair of fasteners each for fixing the ends of the extruded aluminum supports inside the powered main truss chords; a pair of power buss bars supported inside each of the extruded aluminum supports by insulator supports and accessible on one side through the fixture slots; pairs of wires internally interconnecting the pair of power buss bars; sockets formed at each of ends of the powered main truss chords at said end flanges providing for a male-male plug for interconnecting exposed open ends of the powered main truss chords between adjoining said end flanges; and at least one step-down transformer for converting a utility power input into a low voltage which is then applied to the pairs of power buss bars.

* * * * *